United States Patent [19]

Guillot et al.

[11] Patent Number: 4,879,590
[45] Date of Patent: Nov. 7, 1989

[54] COLOR BAR AND AUDIO SIGNAL GENERATOR

[75] Inventors: Walter K. Guillot, 4646 Chelsea Dr., Baton Rouge, La. 70809; Robert D. Brinkman, Chanute, Kans.

[73] Assignees: Walter K. Guillot; L. J. Thibodeaux, both of Baton Rouge, La.; a part interest

[21] Appl. No.: 185,067

[22] Filed: Apr. 22, 1988

[51] Int. Cl.$^4$ ............................................. H04N 17/02
[52] U.S. Cl. ...................................................... 358/10
[58] Field of Search .................................. 358/10, 139

[56] References Cited

U.S. PATENT DOCUMENTS

| 4,149,178 | 4/1979 | Estes | 358/10 |
| 4,268,851 | 5/1981 | Heller et al. | 358/10 |
| 4,635,096 | 1/1987 | Morgan | 358/10 |

OTHER PUBLICATIONS

1987 Fordham Catalog, p. 22.

Primary Examiner—John W. Shepperd
Attorney, Agent, or Firm—John F. Sieberth

[57] ABSTRACT

Modulators for producing a composite video signal comprising composite video color bars of one volt, peak to peak, of the United States NTSC standard type, are described. The modulators include an EPROM matrix coupled to receive the outputs from a video graphics circuit and programed to produce the color bars from such outputs. The modulator also has a decoder interposed between a loop returning the output from the EPROM matrix to the video graphics circuit and thence to an output driver producing an output of color bars at one volt peak to peak into a 75 ohm load. Also described are hand-held modulators which include a self-contained electrical power source; an electronic circuit converting power from this source into a 1000 cycle sine wave audio tone signal of one volt, peak to peak at zero levelout; another electronic circuit converting power from the power source at least into composite video color bars of one volt, peak to peak, of the United States NTSC standard type; and output jacks enabling separate connections to the audio and video signals produced by the device.

31 Claims, 17 Drawing Sheets

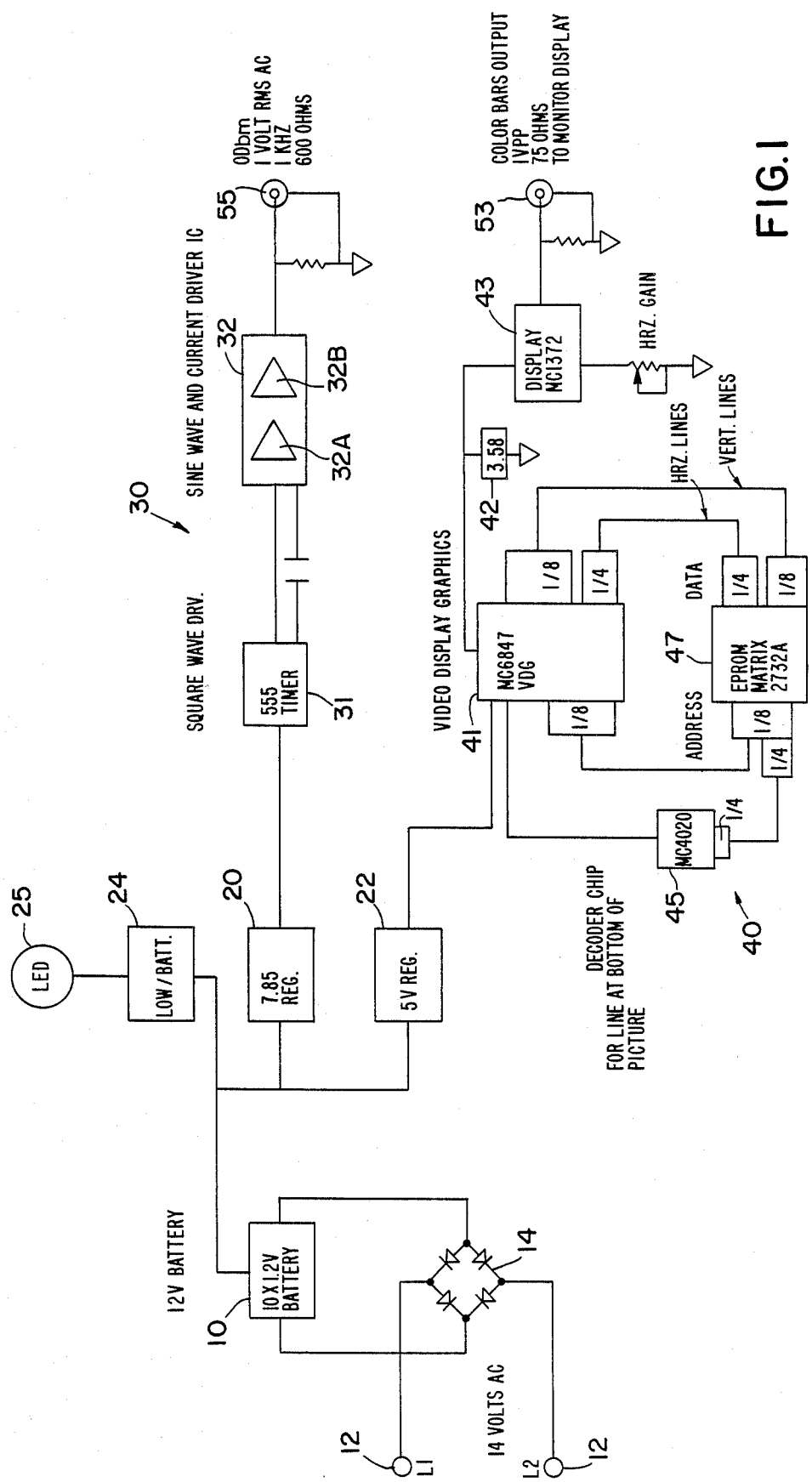

```
00000000  4F 4F 4F 1F 1F 1F 1F 1F 5F 5F 5F 5F 5F 8F 8F 8F  *000..........*
00000010  8F 8F 6F 6F 6F 6F 6F 3F 3F 3F 3F 3F 2F 2F 2F 2F  *..ooooo?????////*
00000020  4F 4F 4F 1F 1F 1F 1F 1F 5F 5F 5F 5F 5F 8F 8F 8F  *000..........*
00000030  8F 8F 6F 6F 6F 6F 6F 3F 3F 3F 3F 3F 2F 2F 2F 2F  *..ooooo?????////*
00000040  4F 4F 4F 1F 1F 1F 1F 1F 5F 5F 5F 5F 5F 8F 8F 8F  *000..........*
00000050  8F 8F 6F 6F 6F 6F 6F 3F 3F 3F 3F 3F 2F 2F 2F 2F  *..ooooo?????////*
00000060  4F 4F 4F 1F 1F 1F 1F 1F 5F 5F 5F 5F 5F 8F 8F 8F  *000..........*
00000070  8F 8F 6F 6F 6F 6F 6F 3F 3F 3F 3F 3F 2F 2F 2F 2F  *..ooooo?????////*
00000080  4F 4F 4F 1F 1F 1F 1F 1F 5F 5F 5F 5F 5F 8F 8F 8F  *000..........*
00000090  8F 8F 6F 6F 6F 6F 6F 3F 3F 3F 3F 3F 2F 2F 2F 2F  *..ooooo?????////*
000000A0  4F 4F 4F 1F 1F 1F 1F 1F 5F 5F 5F 5F 5F 8F 8F 8F  *000..........*
000000B0  8F 8F 6F 6F 6F 6F 6F 3F 3F 3F 3F 3F 2F 2F 2F 2F  *..ooooo?????////*
000000C0  4F 4F 4F 1F 1F 1F 1F 1F 5F 5F 5F 5F 5F 8F 8F 8F  *000..........*
000000D0  8F 8F 6F 6F 6F 6F 6F 3F 3F 3F 3F 3F 2F 2F 2F 2F  *..ooooo?????////*
000000E0  4F 4F 4F 1F 1F 1F 1F 1F 5F 5F 5F 5F 5F 8F 8F 8F  *000..........*
000000F0  8F 8F 6F 6F 6F 6F 6F 3F 3F 3F 3F 3F 2F 2F 2F 2F  *..ooooo?????////*

00000100  4F 4F 4F 1F 1F 1F 1F 1F 5F 5F 5F 5F 5F 8F 8F 8F  *000..........*
00000110  8F 8F 6F 6F 6F 6F 6F 3F 3F 3F 3F 3F 2F 2F 2F 2F  *..ooooo?????////*
00000120  4F 4F 4F 1F 1F 1F 1F 1F 5F 5F 5F 5F 5F 8F 8F 8F  *000..........*
00000130  8F 8F 6F 6F 6F 6F 6F 3F 3F 3F 3F 3F 2F 2F 2F 2F  *..ooooo?????////*
00000140  4F 4F 4F 1F 1F 1F 1F 1F 5F 5F 5F 5F 5F 8F 8F 8F  *000..........*
00000150  8F 8F 6F 6F 6F 6F 6F 3F 3F 3F 3F 3F 2F 2F 2F 2F  *..ooooo?????////*
00000160  4F 4F 4F 1F 1F 1F 1F 1F 5F 5F 5F 5F 5F 8F 8F 8F  *000..........*
00000170  8F 8F 6F 6F 6F 6F 6F 3F 3F 3F 3F 3F 2F 2F 2F 2F  *..ooooo?????////*
00000180  4F 4F 4F 1F 1F 1F 1F 1F 5F 5F 5F 5F 5F 8F 8F 8F  *000..........*
00000190  8F 8F 6F 6F 6F 6F 6F 3F 3F 3F 3F 3F 2F 2F 2F 2F  *..ooooo?????////*
000001A0  4F 4F 4F 1F 1F 1F 1F 1F 5F 5F 5F 5F 5F 8F 8F 8F  *000..........*
000001B0  8F 8F 6F 6F 6F 6F 6F 3F 3F 3F 3F 3F 2F 2F 2F 2F  *..ooooo?????////*
000001C0  4F 4F 4F 1F 1F 1F 1F 1F 5F 5F 5F 5F 5F 8F 8F 8F  *000..........*
000001D0  8F 8F 6F 6F 6F 6F 6F 3F 3F 3F 3F 3F 2F 2F 2F 2F  *..ooooo?????////*
000001E0  2A 20 20 20 20 20 4B 20 52 20 4F 20 4D 20 41     **     K R O M A*
000001F0  20 4C 20 49 20 4E 20 4B 20 20 20 20 20 20 20 2A  * L I N K       **
```

FIG. 4

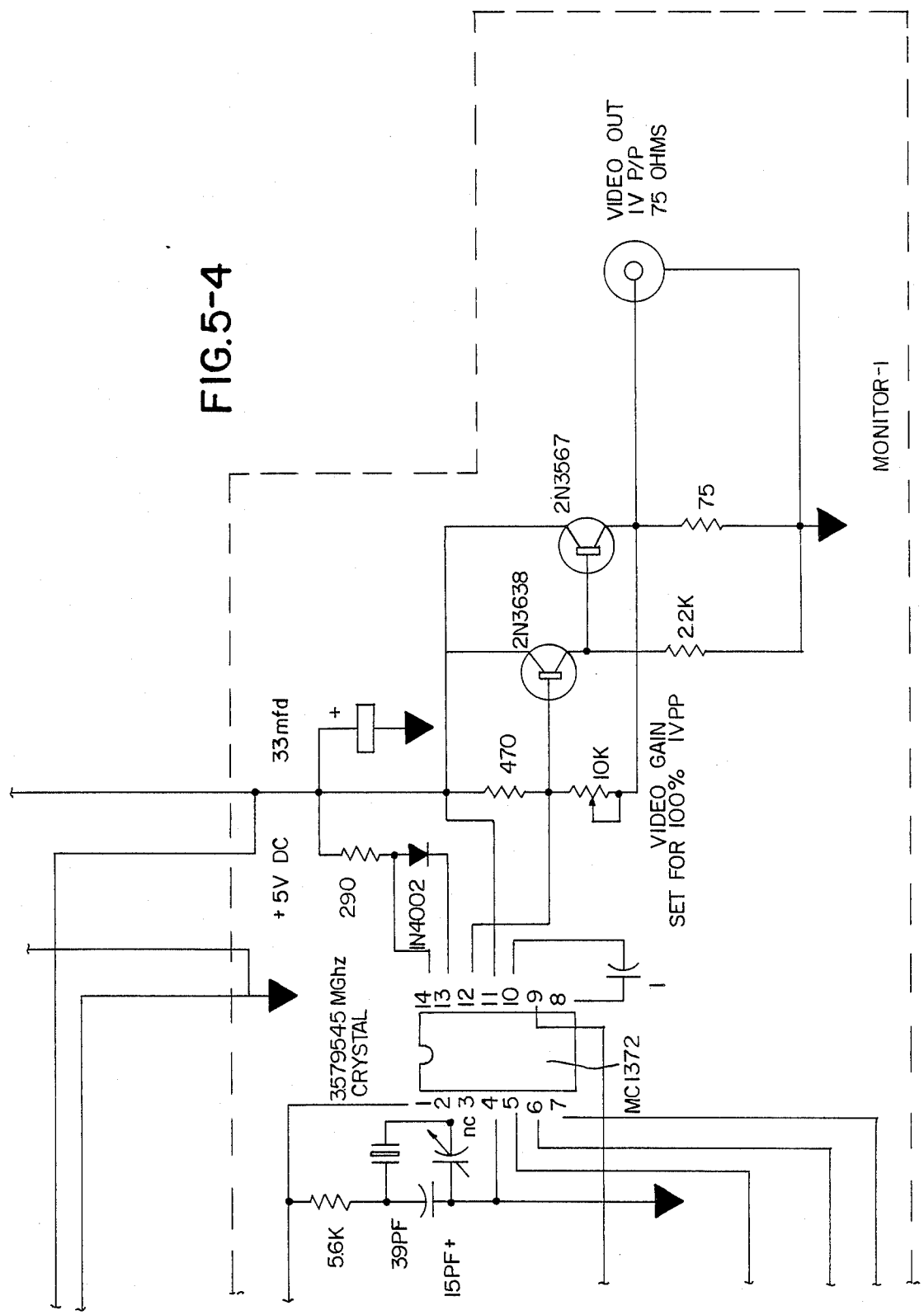

```
000000 4F 4F 4F 1F 1F 1F 1F 1F 5F 5F 5F 5F 5F 8F 8F 8F *OOO.............*
000010 8F 8F 6F 6F 6F 6F 6F 3F 3F 3F 3F 3F 2F 2F 2F 2F *..ooooo?????////*
000020 4F 4F 4F 1F 1F 1F 1F 1F 5F 5F 5F 5F 5F 8F 8F 8F *OOO.............*
000030 8F 8F 6F 6F 6F 6F 6F 3F 3F 3F 3F 3F 2F 2F 2F 2F *..ooooo?????////*
000040 4F 4F 4F 1F 1F 1F 1F 1F 5F 5F 5F 5F 5F 8F 8F 8F *OOO.............*
000050 8F 8F 6F 6F 6F 6F 6F 3F 3F 3F 3F 3F 2F 2F 2F 2F *..ooooo?????////*
000060 4F 4F 4F 1F 1F 1F 1F 1F 5F 5F 5F 5F 5F 8F 8F 8F *OOO.............*
000070 8F 8F 6F 6F 6F 6F 6F 3F 3F 3F 3F 3F 2F 2F 2F 2F *..ooooo?????////*
000080 4F 4F 4F 1F 1F 1F 1F 1F 5F 5F 5F 5F 5F 8F 8F 8F *OOO.............*
000090 8F 8F 6F 6F 6F 6F 6F 3F 3F 3F 3F 3F 2F 2F 2F 2F *..ooooo?????////*
0000A0 4F 4F 4F 1F 1F 1F 1F 1F 5F 5F 5F 5F 5F 8F 8F 8F *OOO.............*
0000B0 8F 8F 6F 6F 6F 6F 6F 3F 3F 3F 3F 3F 2F 2F 2F 2F *..ooooo?????////*
0000C0 4F 4F 4F 1F 1F 1F 1F 1F 5F 5F 5F 5F 5F 8F 8F 8F *OOO.............*
0000D0 8F 8F 6F 6F 6F 6F 6F 3F 3F 3F 3F 3F 2F 2F 2F 2F *..ooooo?????////*
0000E0 4F 4F 4F 1F 1F 1F 1F 1F 5F 5F 5F 5F 5F 8F 8F 8F *OOO.............*
0000F0 8F 8F 6F 6F 6F 6F 6F 3F 3F 3F 3F 3F 2F 2F 2F 2F *..ooooo?????////*
000100 4F 4F 4F 1F 1F 1F 1F 1F 5F 5F 5F 5F 5F 8F 8F 8F *OOO.............*
000110 8F 8F 6F 6F 6F 6F 6F 3F 3F 3F 3F 3F 2F 2F 2F 2F *..ooooo?????////*
000120 4F 4F 4F 1F 1F 1F 1F 1F 5F 5F 5F 5F 5F 8F 8F 8F *OOO.............*
000130 8F 8F 6F 6F 6F 6F 6F 3F 3F 3F 3F 3F 2F 2F 2F 2F *..ooooo?????////*
000140 4F 4F 4F 1F 1F 1F 1F 1F 5F 5F 5F 5F 5F 8F 8F 8F *OOO.............*
000150 8F 8F 6F 6F 6F 6F 6F 3F 3F 3F 3F 3F 2F 2F 2F 2F *..ooooo?????////*
000160 4F 4F 4F 1F 1F 1F 1F 1F 5F 5F 5F 5F 5F 8F 8F 8F *OOO.............*
000170 8F 8F 6F 6F 6F 6F 6F 3F 3F 3F 3F 3F 2F 2F 2F 2F *..ooooo?????////*
000180 4F 4F 4F 1F 1F 1F 1F 1F 5F 5F 5F 5F 5F 8F 8F 8F *OOO.............*
000190 8F 8F 6F 6F 6F 6F 6F 3F 3F 3F 3F 3F 2F 2F 2F 2F *..ooooo?????////*
0001A0 4F 4F 4F 1F 1F 1F 1F 1F 5F 5F 5F 5F 5F 8F 8F 8F *OOO.............*
0001B0 8F 8F 6F 6F 6F 6F 6F 3F 3F 3F 3F 3F 2F 2F 2F 2F *..ooooo?????////*
0001C0 4F 4F 4F 1F 1F 1F 1F 1F 5F 5F 5F 5F 5F 8F 8F 8F *OOO.............*
0001D0 8F 8F 6F 6F 6F 6F 6F 3F 3F 3F 3F 3F 2F 2F 2F 2F *..ooooo?????////*
0001E0 2A 20 20 20 20 20 20 4B 20 52 20 4F 20 4D 20 41 **     K R O M A*
0001F0 20 4C 20 49 20 4E 20 4B 20 20 20 20 20 20 31 2A * L I N K      1**
000200 1F 1F 1F 1F 1F 1F 1F 1F 4F 4F 6F 6F 6F 6F 6F 6F *.........OOoooooo*
000210 6F 6F 6F 6F 4F 4F 5F 5F 5F 5F 5F 5F 5F 5F 5F 5F *oooOO_____*
000220 1F 1F 1F 1F 1F 1F 1F 1F 4F 4F 6F 6F 6F 6F 6F 6F *.........OOoooooo*
000230 6F 6F 6F 6F 4F 4F 5F 5F 5F 5F 5F 5F 5F 5F 5F 5F *oooOO_____*
000240 1F 1F 1F 1F 1F 1F 1F 1F 4F 4F 6F 6F 6F 6F 6F 6F *.........OOoooooo*
000250 6F 6F 6F 6F 4F 4F 5F 5F 5F 5F 5F 5F 5F 5F 5F 5F *oooOO_____*
000260 1F 1F 1F 1F 1F 1F 1F 1F 4F 4F 6F 6F 6F 6F 6F 6F *.........OOoooooo*
000270 6F 6F 6F 6F 4F 4F 5F 5F 5F 5F 5F 5F 5F 5F 5F 5F *oooOO_____*
000280 1F 1F 1F 1F 1F 1F 1F 1F 4F 4F 6F 6F 6F 6F 6F 6F *.........OOoooooo*
000290 6F 6F 6F 6F 4F 4F 5F 5F 5F 5F 5F 5F 5F 5F 5F 5F *oooOO_____*
0002A0 1F 1F 1F 1F 1F 1F 1F 1F 4F 4F 6F 6F 6F 6F 6F 6F *.........OOoooooo*
0002B0 6F 6F 6F 6F 4F 4F 5F 5F 5F 5F 5F 5F 5F 5F 5F 5F *oooOO_____*
0002C0 1F 1F 1F 1F 1F 1F 1F 1F 4F 4F 6F 6F 6F 6F 6F 6F *.........OOoooooo*
0002D0 6F 6F 6F 6F 4F 4F 5F 5F 5F 5F 5F 5F 5F 5F 5F 5F *oooOO_____*
0002E0 1F 1F 1F 1F 1F 1F 1F 1F 4F 4F 6F 6F 6F 6F 6F 6F *.........OOoooooo*
0002F0 6F 6F 6F 6F 4F 4F 5F 5F 5F 5F 5F 5F 5F 5F 5F 5F *oooOO_____*
000300 1F 1F 1F 1F 1F 1F 1F 1F 4F 4F 6F 6F 6F 6F 6F 6F *.........OOoooooo*
000310 6F 6F 6F 6F 4F 4F 5F 5F 5F 5F 5F 5F 5F 5F 5F 5F *oooOO_____*
000320 1F 1F 1F 1F 1F 1F 1F 1F 4F 4F 6F 6F 6F 6F 6F 6F *.........OOoooooo*
000330 6F 6F 6F 6F 4F 4F 5F 5F 5F 5F 5F 5F 5F 5F 5F 5F *oooOO_____*
000340 1F 1F 1F 1F 1F 1F 1F 1F 4F 4F 6F 6F 6F 6F 6F 6F *.........OOoooooo*
000350 6F 6F 6F 6F 4F 4F 5F 5F 5F 5F 5F 5F 5F 5F 5F 5F *oooOO_____*
000360 1F 1F 1F 1F 1F 1F 1F 1F 4F 4F 6F 6F 6F 6F 6F 6F *.........OOoooooo*
000370 6F 6F 6F 6F 4F 4F 5F 5F 5F 5F 5F 5F 5F 5F 5F 5F *oooOO_____*
000380 1F 1F 1F 1F 1F 1F 1F 1F 4F 4F 6F 6F 6F 6F 6F 6F *.........OOoooooo*
000390 6F 6F 6F 6F 4F 4F 5F 5F 5F 5F 5F 5F 5F 5F 5F 5F *oooOO_____*
0003A0 1F 1F 1F 1F 1F 1F 1F 1F 4F 4F 6F 6F 6F 6F 6F 6F *.........OOoooooo*
0003B0 6F 6F 6F 6F 4F 4F 5F 5F 5F 5F 5F 5F 5F 5F 5F 5F *oooOO_____*
0003C0 1F 1F 1F 1F 1F 1F 1F 1F 4F 4F 6F 6F 6F 6F 6F 6F *.........OOoooooo*
0003D0 6F 6F 6F 6F 4F 4F 5F 5F 5F 5F 5F 5F 5F 5F 5F 5F *oooOO_____*
0003E0 2A 20 20 20 20 20 20 4B 20 52 20 4F 20 4D 20 41 **     K R O M A*
0003F0 20 4C 20 49 20 4E 20 4B 20 20 20 20 20 20 32 2A * L I N K      2**
```

FIG. 6A

```
000400 5F 5F 5F 5F 5F 5F 5F 5F 5F 4F 4F 6F 6F 6F 6F 6F *_____0Oooooo*
000410 6F 6F 6F 6F 4F 4F 8F 8F 8F 8F 8F 8F 8F 8F 8F 8F *oooooo.........*
000420 5F 5F 5F 5F 5F 5F 5F 5F 5F 4F 4F 6F 6F 6F 6F 6F *_____0Oooooo*
000430 6F 6F 6F 6F 4F 4F 8F 8F 8F 8F 8F 8F 8F 8F 8F 8F *oooooo.........*
000440 5F 5F 5F 5F 5F 5F 5F 5F 5F 4F 4F 6F 6F 6F 6F 6F *_____0Oooooo*
000450 6F 6F 6F 6F 4F 4F 8F 8F 8F 8F 8F 8F 8F 8F 8F 8F *oooooo.........*
000460 5F 5F 5F 5F 5F 5F 5F 5F 5F 4F 4F 6F 6F 6F 6F 6F *_____0Oooooo*
000470 6F 6F 6F 6F 4F 4F 8F 8F 8F 8F 8F 8F 8F 8F 8F 8F *oooooo.........*
000480 5F 5F 5F 5F 5F 5F 5F 5F 5F 4F 4F 6F 6F 6F 6F 6F *_____0Oooooo*
000490 6F 6F 6F 6F 4F 4F 8F 8F 8F 8F 8F 8F 8F 8F 8F 8F *oooooo.........*
0004A0 5F 5F 5F 5F 5F 5F 5F 5F 5F 4F 4F 6F 6F 6F 6F 6F *_____0Oooooo*
0004B0 6F 6F 6F 6F 4F 4F 8F 8F 8F 8F 8F 8F 8F 8F 8F 8F *oooooo.........*
0004C0 5F 5F 5F 5F 5F 5F 5F 5F 5F 4F 4F 6F 6F 6F 6F 6F *_____0Oooooo*
0004D0 6F 6F 6F 6F 4F 4F 8F 8F 8F 8F 8F 8F 8F 8F 8F 8F *oooooo.........*
0004E0 5F 5F 5F 5F 5F 5F 5F 5F 5F 4F 4F 6F 6F 6F 6F 6F *_____0Oooooo*
0004F0 6F 6F 6F 6F 4F 4F 8F 8F 8F 8F 8F 8F 8F 8F 8F 8F *oooooo.........*
000500 5F 5F 5F 5F 5F 5F 5F 5F 5F 4F 4F 6F 6F 6F 6F 6F *_____-0Oooooo*
000510 6F 6F 6F 6F 4F 4F 8F 8F 8F 8F 8F 8F 8F 8F 8F 8F *oooooo.........*
000520 5F 5F 5F 5F 5F 5F 5F 5F 5F 4F 4F 6F 6F 6F 6F 6F *_____0Oooooo*
000530 6F 6F 6F 6F 4F 4F 8F 8F 8F 8F 8F 8F 8F 8F 8F 8F *oooooo.........*
000540 5F 5F 5F 5F 5F 5F 5F 5F 5F 4F 4F 6F 6F 6F 6F 6F *_____0Oooooo*
000550 6F 6F 6F 6F 4F 4F 8F 8F 8F 8F 8F 8F 8F 8F 8F 8F *oooooo.........*
000560 5F 5F 5F 5F 5F 5F 5F 5F 5F 4F 4F 6F 6F 6F 6F 6F *_____0Oooooo*
000570 6F 6F 6F 6F 4F 4F 8F 8F 8F 8F 8F 8F 8F 8F 8F 8F *oooooo.........*
000580 5F 5F 5F 5F 5F 5F 5F 5F 5F 4F 4F 6F 6F 6F 6F 6F *_____0Oooooo*
000590 6F 6F 6F 6F 4F 4F 8F 8F 8F 8F 8F 8F 8F 8F 8F 8F *oooooo.........*
0005A0 5F 5F 5F 5F 5F 5F 5F 5F 5F 4F 4F 6F 6F 6F 6F 6F *_____0Oooooo*
0005B0 6F 6F 6F 6F 4F 4F 8F 8F 8F 8F 8F 8F 8F 8F 8F 8F *oooooo.........*
0005C0 5F 5F 5F 5F 5F 5F 5F 5F 5F 4F 4F 6F 6F 6F 6F 6F *_____0Oooooo*
0005D0 6F 6F 6F 6F 4F 4F 8F 8F 8F 8F 8F 8F 8F 8F 8F 8F *oooooo.........*
0005E0 2A 20 20 20 20 20 20 4B 20 52 20 4F 20 4D 20 41 **     K R O M A*
0005F0 20 4C 20 49 20 4E 20 4B 20 20 20 20 20 20 33 2A * L I N K      3**
000600 3F 3F 3F 3F 3F 3F 3F 3F 3F 4F 4F 6F 6F 6F 6F 6F *????????0Oooooo*
000610 6F 6F 6F 6F 4F 4F 2F 2F 2F 2F 2F 2F 2F 2F 2F 2F *oooooo//////////*
000620 3F 3F 3F 3F 3F 3F 3F 3F 3F 4F 4F 6F 6F 6F 6F 6F *????????0Oooooo*
000630 6F 6F 6F 6F 4F 4F 2F 2F 2F 2F 2F 2F 2F 2F 2F 2F *oooooo//////////*
000640 3F 3F 3F 3F 3F 3F 3F 3F 3F 4F 4F 6F 6F 6F 6F 6F *????????0Oooooo*
000650 6F 6F 6F 6F 4F 4F 2F 2F 2F 2F 2F 2F 2F 2F 2F 2F *oooooo//////////*
000660 3F 3F 3F 3F 3F 3F 3F 3F 3F 4F 4F 6F 6F 6F 6F 6F *????????0Oooooo*
000670 6F 6F 6F 6F 4F 4F 2F 2F 2F 2F 2F 2F 2F 2F 2F 2F *oooooo//////////*
000680 3F 3F 3F 3F 3F 3F 3F 3F 3F 4F 4F 6F 6F 6F 6F 6F *????????0Oooooo*
000690 6F 6F 6F 6F 4F 4F 2F 2F 2F 2F 2F 2F 2F 2F 2F 2F *oooooo//////////*
0006A0 3F 3F 3F 3F 3F 3F 3F 3F 3F 4F 4F 6F 6F 6F 6F 6F *????????0Oooooo*
0006B0 6F 6F 6F 6F 4F 4F 2F 2F 2F 2F 2F 2F 2F 2F 2F 2F *oooooo//////////*
0006C0 3F 3F 3F 3F 3F 3F 3F 3F 3F 4F 4F 6F 6F 6F 6F 6F *????????0Oooooo*
0006D0 6F 6F 6F 6F 4F 4F 2F 2F 2F 2F 2F 2F 2F 2F 2F 2F *oooooo//////////*
0006E0 3F 3F 3F 3F 3F 3F 3F 3F 3F 4F 4F 6F 6F 6F 6F 6F *????????0Oooooo*
0006F0 6F 6F 6F 6F 4F 4F 2F 2F 2F 2F 2F 2F 2F 2F 2F 2F *oooooo//////////*
000700 3F 3F 3F 3F 3F 3F 3F 3F 3F 4F 4F 6F 6F 6F 6F 6F *????????0Oooooo*
000710 6F 6F 6F 6F 4F 4F 2F 2F 2F 2F 2F 2F 2F 2F 2F 2F *oooooo//////////*
000720 3F 3F 3F 3F 3F 3F 3F 3F 3F 4F 4F 6F 6F 6F 6F 6F *????????0Oooooo*
000730 6F 6F 6F 6F 4F 4F 2F 2F 2F 2F 2F 2F 2F 2F 2F 2F *oooooo//////////*
000740 3F 3F 3F 3F 3F 3F 3F 3F 3F 4F 4F 6F 6F 6F 6F 6F *????????0Oooooo*
000750 6F 6F 6F 6F 4F 4F 2F 2F 2F 2F 2F 2F 2F 2F 2F 2F *oooooo//////////*
000760 3F 3F 3F 3F 3F 3F 3F 3F 3F 4F 4F 6F 6F 6F 6F 6F *????????0Oooooo*
000770 6F 6F 6F 6F 4F 4F 2F 2F 2F 2F 2F 2F 2F 2F 2F 2F *oooooo//////////*
000780 3F 3F 3F 3F 3F 3F 3F 3F 3F 4F 4F 6F 6F 6F 6F 6F *????????0Oooooo*
000790 6F 6F 6F 6F 4F 4F 2F 2F 2F 2F 2F 2F 2F 2F 2F 2F *oooooo//////////*
0007A0 3F 3F 3F 3F 3F 3F 3F 3F 3F 4F 4F 6F 6F 6F 6F 6F *????????0Oooooo*
0007B0 6F 6F 6F 6F 4F 4F 2F 2F 2F 2F 2F 2F 2F 2F 2F 2F *oooooo//////////*
0007C0 3F 3F 3F 3F 3F 3F 3F 3F 3F 4F 4F 6F 6F 6F 6F 6F *????????0Oooooo*
0007D0 6F 6F 6F 6F 4F 4F 2F 2F 2F 2F 2F 2F 2F 2F 2F 2F *oooooo//////////*
0007E0 2A 20 20 20 20 20 20 4B 20 52 20 4F 20 4D 20 41 **     K R O M A*
0007F0 20 4C 20 49 20 4E 20 4B 20 20 20 20 20 20 34 2A * L I N K      4**
```

FIG. 6B

```
000800  4F 4F 4F 4F 4F 4F 4F 4F 4F 4F 4F 4F 4F 4F 4F 4F  *OOOOOOOOOOOOOOOO*
000810  4F 4F 4F 4F 4F 4F 4F 4F 4F 4F 4F 4F 4F 4F 4F 4F  *OOOOOOOOOOOOOOOO*
000820  4F 4F 4F 4F 4F 4F 4F 4F 4F 4F 4F 4F 4F 4F 4F 4F  *OOOOOOOOOOOOOOOO*
000830  4F 4F 4F 4F 4F 4F 4F 4F 4F 4F 4F 4F 4F 4F 4F 4F  *OOOOOOOOOOOOOOOO*
000840  1F 1F 1F 1F 1F 1F 1F 1F 1F 1F 1F 1F 1F 1F 1F 1F  *................*
000850  1F 1F 1F 1F 1F 1F 1F 1F 1F 1F 1F 1F 1F 1F 1F 1F  *................*
000860  1F 1F 1F 1F 1F 1F 1F 1F 1F 1F 1F 1F 1F 1F 1F 1F  *................*
000870  1F 1F 1F 1F 1F 1F 1F 1F 1F 1F 1F 1F 1F 1F 1F 1F  *................*
000880  5F 5F 5F 5F 5F 5F 5F 5F 5F 5F 5F 5F 5F 5F 5F 5F  *_____*
000890  5F 5F 5F 5F 5F 5F 5F 5F 5F 5F 5F 5F 5F 5F 5F 5F  *_____*
0008A0  5F 5F 5F 5F 5F 5F 5F 5F 5F 5F 5F 5F 5F 5F 5F 5F  *_____*
0008B0  5F 5F 5F 5F 5F 5F 5F 5F 5F 5F 5F 5F 5F 5F 5F 5F  *_____*
0008C0  8F 8F 8F 8F 8F 8F 8F 8F 8F 8F 8F 8F 8F 8F 8F 8F  *................*
0008D0  8F 8F 8F 8F 8F 8F 8F 8F 8F 8F 8F 8F 8F 8F 8F 8F  *................*
0008E0  8F 8F 8F 8F 8F 8F 8F 8F 8F 8F 8F 8F 8F 8F 8F 8F  *................*
0008F0  8F 8F 8F 8F 8F 8F 8F 8F 8F 8F 8F 8F 8F 8F 8F 8F  *................*
000900  6F 6F 6F 6F 6F 6F 6F 6F 6F 6F 6F 6F 6F 6F 6F 6F  *oooooooooooooooo*
000910  6F 6F 6F 6F 6F 6F 6F 6F 6F 6F 6F 6F 6F 6F 6F 6F  *oooooooooooooooo*
000920  6F 6F 6F 6F 6F 6F 6F 6F 6F 6F 6F 6F 6F 6F 6F 6F  *oooooooooooooooo*
000930  6F 6F 6F 6F 6F 6F 6F 6F 6F 6F 6F 6F 6F 6F 6F 6F  *oooooooooooooooo*
000940  3F 3F 3F 3F 3F 3F 3F 3F 3F 3F 3F 3F 3F 3F 3F 3F  *????????????????*
000950  3F 3F 3F 3F 3F 3F 3F 3F 3F 3F 3F 3F 3F 3F 3F 3F  *????????????????*
000960  3F 3F 3F 3F 3F 3F 3F 3F 3F 3F 3F 3F 3F 3F 3F 3F  *????????????????*
000970  3F 3F 3F 3F 3F 3F 3F 3F 3F 3F 3F 3F 3F 3F 3F 3F  *????????????????*
000980  2F 2F 2F 2F 2F 2F 2F 2F 2F 2F 2F 2F 2F 2F 2F 2F  *////////////////*
000990  2F 2F 2F 2F 2F 2F 2F 2F 2F 2F 2F 2F 2F 2F 2F 2F  *////////////////*
0009A0  2F 2F 2F 2F 2F 2F 2F 2F 2F 2F 2F 2F 2F 2F 2F 2F  *////////////////*
0009B0  2F 2F 2F 2F 2F 2F 2F 2F 2F 2F 2F 2F 2F 2F 2F 2F  *////////////////*
0009C0  20 20 20 20 20 20 20 20 20 20 20 20 20 20 20 20  *                *
0009D0  20 20 20 20 20 20 20 20 20 20 20 20 20 20 20 20  *                *
0009E0  2A 20 20 20 20 20 20 4B 20 52 20 4F 20 4D 20 41  **    K R O M A*
0009F0  20 4C 20 49 20 4E 20 4B 20 20 20 20 20 20 35 2A  * L I N K      5**
000A00  8F 8F 8F 8F 8F 8F 8F 8F 8F 8F 8F 8F 8F 8F 8F 8F  *................*
000A10  8F 8F 8F 8F 8F 8F 8F 8F 8F 8F 8F 8F 8F 8F 8F 8F  *................*
000A20  8F 8F 8F 8F 8F 8F 8F 8F 8F 8F 8F 8F 8F 8F 8F 8F  *................*
000A30  8F 8F 8F 8F 8F 8F 8F 8F 8F 8F 8F 8F 8F 8F 8F 8F  *................*
000A40  8F 8F 8F 8F 8F 8F 8F 8F 8F 8F 8F 8F 8F 8F 8F 8F  *................*
000A50  8F 8F 8F 8F 8F 8F 8F 8F 8F 8F 8F 8F 8F 8F 8F 8F  *................*
000A60  8F 8F 8F 8F 8F 8F 8F 8F 8F 8F 8F 8F 8F 8F 8F 8F  *................*
000A70  8F 8F 8F 8F 8F 8F 8F 8F 8F 8F 8F 8F 8F 8F 8F 8F  *................*
000A80  8F 8F 8F 8F 8F 8F 8F 8F 8F 8F 8F 8F 8F 8F 8F 8F  *................*
000A90  8F 8F 8F 8F 8F 8F 8F 8F 8F 8F 8F 8F 8F 8F 8F 8F  *................*
000AA0  8F 8F 8F 8F 8F 8F 8F 8F 8F 8F 8F 8F 8F 8F 8F 8F  *................*
000AB0  8F 8F 8F 8F 8F 8F 8F 8F 8F 8F 8F 8F 8F 8F 8F 8F  *................*
000AC0  8F 8F 8F 8F 8F 8F 8F 8F 8F 8F 8F 8F 8F 8F 8F 8F  *................*
000AD0  8F 8F 8F 8F 8F 8F 8F 8F 8F 8F 8F 8F 8F 8F 8F 8F  *................*
000AE0  8F 8F 8F 8F 8F 8F 8F 8F 8F 8F 8F 8F 8F 8F 8F 8F  *................*
000AF0  8F 8F 8F 8F 8F 8F 8F 8F 8F 8F 8F 8F 8F 8F 8F 8F  *................*
000B00  8F 8F 8F 8F 8F 8F 8F 8F 8F 8F 8F 8F 8F 8F 8F 8F  *................*
000B10  8F 8F 8F 8F 8F 8F 8F 8F 8F 8F 8F 8F 8F 8F 8F 8F  *................*
000B20  8F 8F 8F 8F 8F 8F 8F 8F 8F 8F 8F 8F 8F 8F 8F 8F  *................*
000B30  8F 8F 8F 8F 8F 8F 8F 8F 8F 8F 8F 8F 8F 8F 8F 8F  *................*
000B40  8F 8F 8F 8F 8F 8F 8F 8F 8F 8F 8F 8F 8F 8F 8F 8F  *................*
000B50  8F 8F 8F 8F 8F 8F 8F 8F 8F 8F 8F 8F 8F 8F 8F 8F  *................*
000B60  8F 8F 8F 8F 8F 8F 8F 8F 8F 8F 8F 8F 8F 8F 8F 8F  *................*
000B70  8F 8F 8F 8F 8F 8F 8F 8F 8F 8F 8F 8F 8F 8F 8F 8F  *................*
000B80  8F 8F 8F 8F 8F 8F 8F 8F 8F 8F 8F 8F 8F 8F 8F 8F  *................*
000B90  8F 8F 8F 8F 8F 8F 8F 8F 8F 8F 8F 8F 8F 8F 8F 8F  *................*
000BA0  8F 8F 8F 8F 8F 8F 8F 8F 8F 8F 8F 8F 8F 8F 8F 8F  *................*
000BB0  8F 8F 8F 8F 8F 8F 8F 8F 8F 8F 8F 8F 8F 8F 8F 8F  *................*
000BC0  8F 8F 8F 8F 8F 8F 8F 8F 8F 8F 8F 8F 8F 8F 8F 8F  *................*
000BD0  8F 8F 8F 8F 8F 8F 8F 8F 8F 8F 8F 8F 8F 8F 8F 8F  *................*
000BE0  2A 20 20 20 20 20 20 4B 20 52 20 4F 20 4D 20 41  **    K R O M A*
000BF0  20 4C 20 49 20 4E 20 4B 20 20 20 20 20 20 36 2A  * L I N K      6**
```

COLOR BAR AND AUDIO SIGNAL GENERATOR

TECHNICAL FIELD

This invention relates to an electronic generator or modulator, and more particularly to an electronic device capable of producing audio and video signals complying with the U.S. NTSC standards.

BACKGROUND

The television production industry has, for many years, had to make physical sacrifices to be able to produce Color Bars (the standard unit of measure for color continuity) when and as needed in the field. In the past, color bars were originated from a rack mounted, 19 inch, 117 volt AC, non-portable device, or an upperline television camera with a built-in color bar generator. Unfortunately, such broadcast quality television cameras of this quality level are quite expensive, which makes the use of such cameras for color bar generation impractical.

SUMMARY OF THE INVENTION

This invention involves, inter alia, the discovery of a need and means for fulfilling this need.

In particular, the need has been found to exit for an inexpensive, truly portable generator or modulator capable of producing audio and video signals matching the NTSC standards. Such a device would be used in the field as a method of checking the line before a TV camera is used, and to prepare a location set-up before a camera is available. Such a device could also facilitate the set up of dishes for peaking, and camera set up. Similarly, cable companies would be able to check their cables to the location being hooked up to the line.

An example of the need for such a device exists in TV stores and department stores where oftentimes 15 or 20 or more TV sets may be in operation in banks or side by side. More often than not, the colors from set to set differ considerably even among several sets of the same make and model. A portable and inexpensive modulator supplying NTSC standard signals would enable such stores to check out and adjust the color of the sets when on display and thus improve sales appeal. In addition, the device would enable the stores to check out and adjust the color just prior to delivering the sets to or installing the sets for the purchaser. Other similar needs for and applications of such a device should now be evident to those skilled in the art.

This invention is believed to fulfill the foregoing needs in a most efficient and expeditious manner by providing, in accordance with one embodiment, a hand-held (pocket size) generator or modulator which comprises a self-contained electrical power source, first means converting power from said source into a 1000 cycle sine wave audio tone signal of one volt, peak to peak at zero levelout, first output means for such signal, second means converting power from the power source into composite video color bars of one volt, peak to peak, of the United States NTSC standard type, and second output means for such composite video color bars. The term "hand-held" is used in its commonly accepted sense, viz., that the device is sized to be held in an average sized hand of an adult, much in the same way as a hand-held calculator or like device. The modulators of this invention are normally contained within a casing, usually molded from a plastic material having suitable strength and durability characteristics.

The self-contained power source of the modulators of this invention is preferably composed of rechargeable batteries and the device is preferably equipped with input jacks or the like to receive a power supply from a suitable external source such as an AC or DC battery charger and to transmit the incoming current to the batteries in order to recharge them when and as needed. Most preferably this circuit includes a diode bridge or other rectifier means so that the incoming current, if AC, is converted to DC for the batteries. It will be understood that if desired suitable solar cells or other self-contained electrical power sources may be employed in lieu of dry cell batteries.

The above first means for producing the above audio signal preferably comprises a square wave driver energized by the self-contained power source and transmitting its output signal to a sine wave and current driver integrated circuit which is in turn connected to the first output means, such as an output jack or the like. This integrated circuit is adapted to produce the desired audio signal of the NTSC standard referred to above.

The above second means producing the above composite video signal preferably includes an EPROM matrix coupled to receive the outputs from a video graphics circuit and having decoder means interposed between a loop returning the output from the EPROM matrix to the video graphics circuit and thence to output driver means producing an output of color bars at one volt peak to peak into a 75 ohm load. Alternatively, the output driver means may be of the RF type so as to drive a 75 RF version.

Preferably the modulator also includes means for producing a signal (most preferably an L.E.D. display) to show in advance when the power source will be reaching the point of needing a recharge. An on-off power switch and display therefor is also desirably included in the overall modulator system of this invention.

These and other embodiments, features, and advantages of this invention will be still further apparent from the ensuing description, appended claims, and accompanying drawings.

THE DRAWINGS

Figures 1, 5:
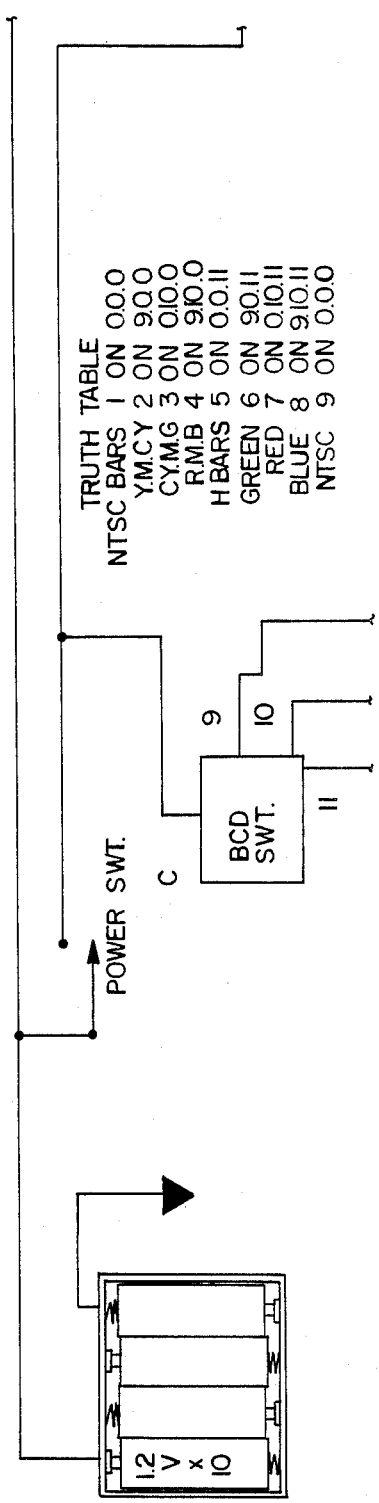
FIG. 5 is a detailed parts and wiring diagram of an alternative eight (8) screen modulator system of FIG. 1.
Figures 2, 5:
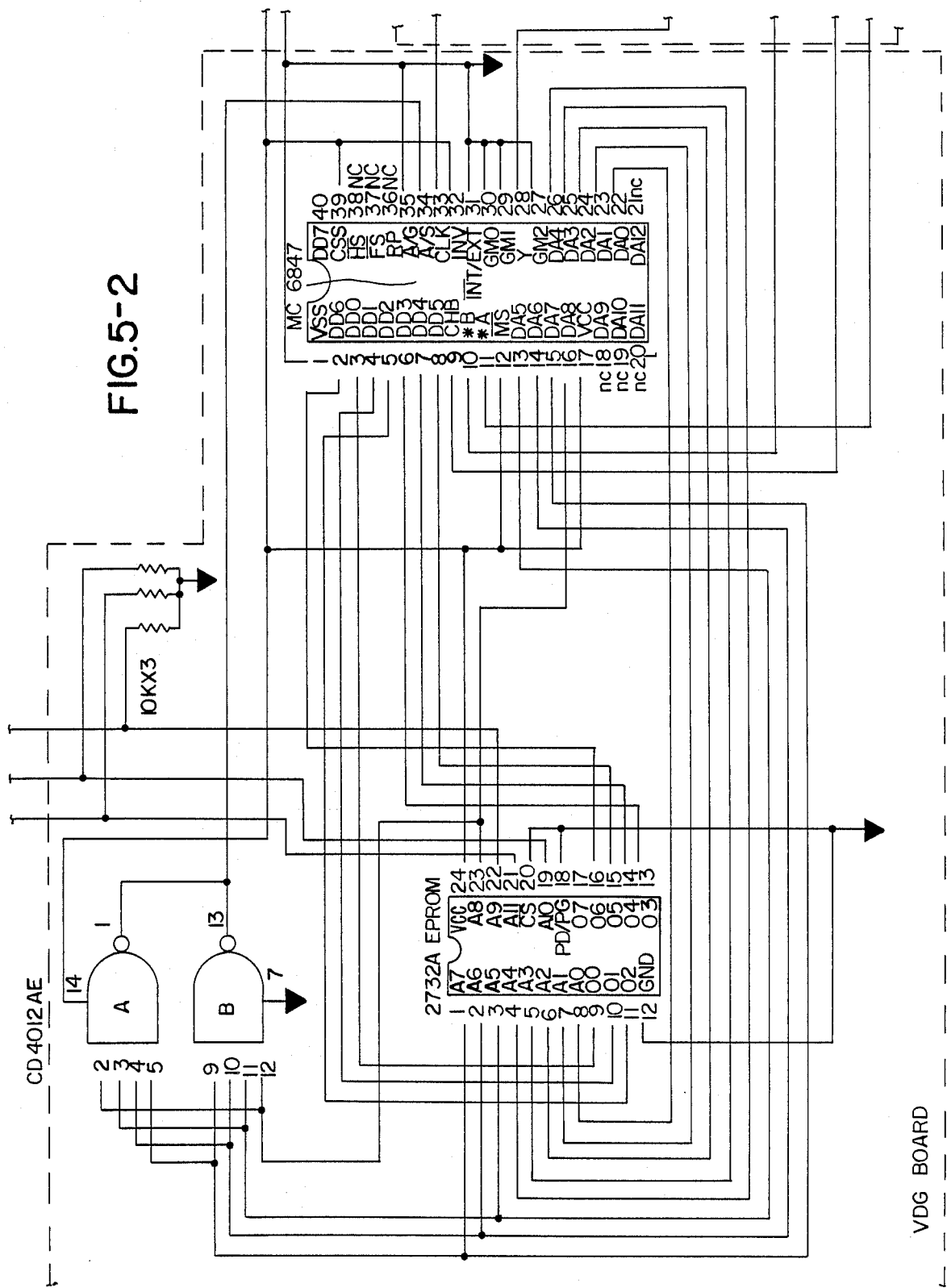
Figures 3, 5:
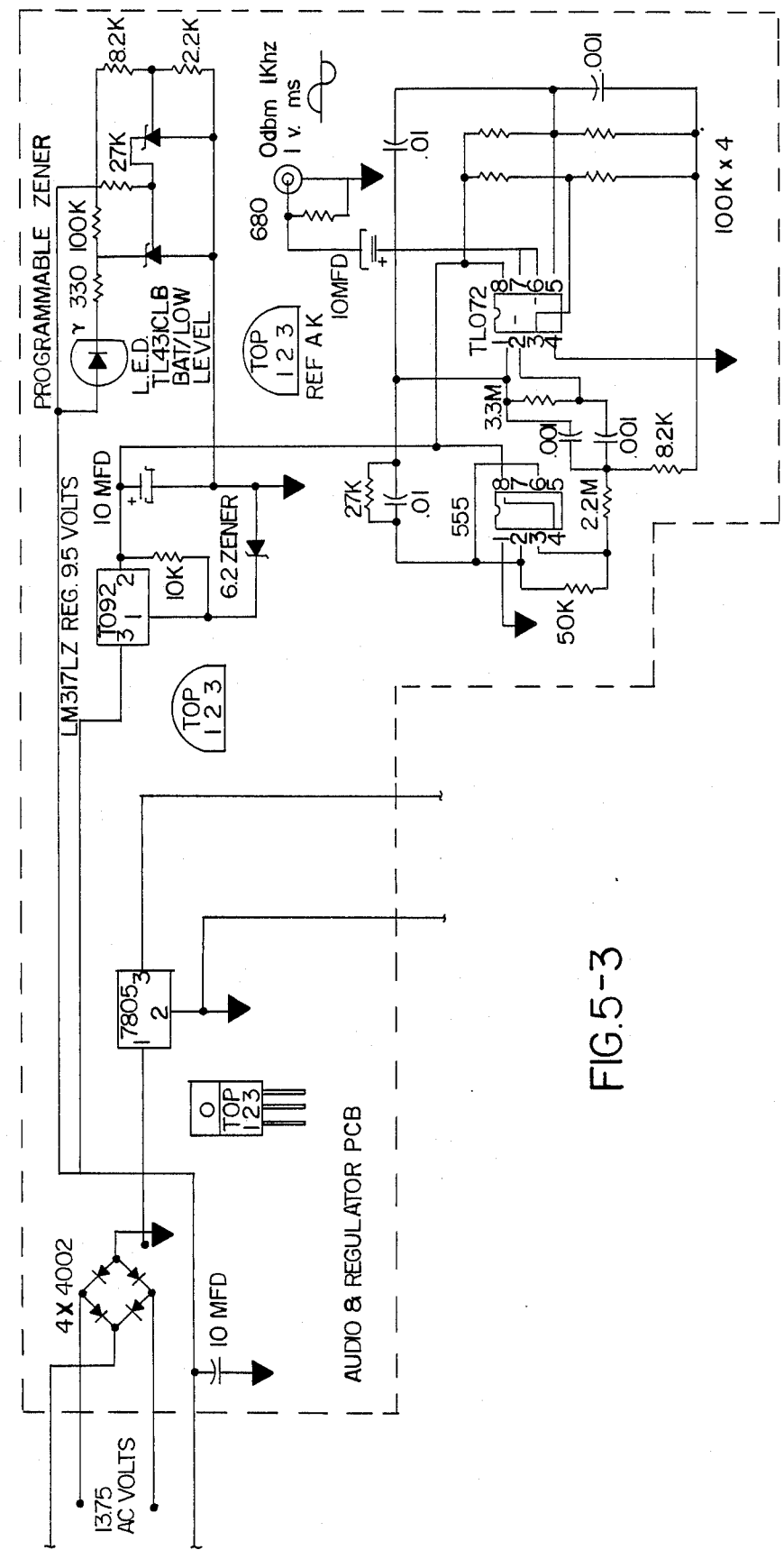

FIGS. 6A, 6B, 6C, and 6D taken together constitute a program for an EPROM in an eight screen system of the type of FIG. 5, in which the upper 30 lines of each screen produce the color bars and the bottom two lines produce in this particular instance, a trademark display.

DESCRIPTION OF PREFERRED EMBODIMENTS

Figures 1, 2:
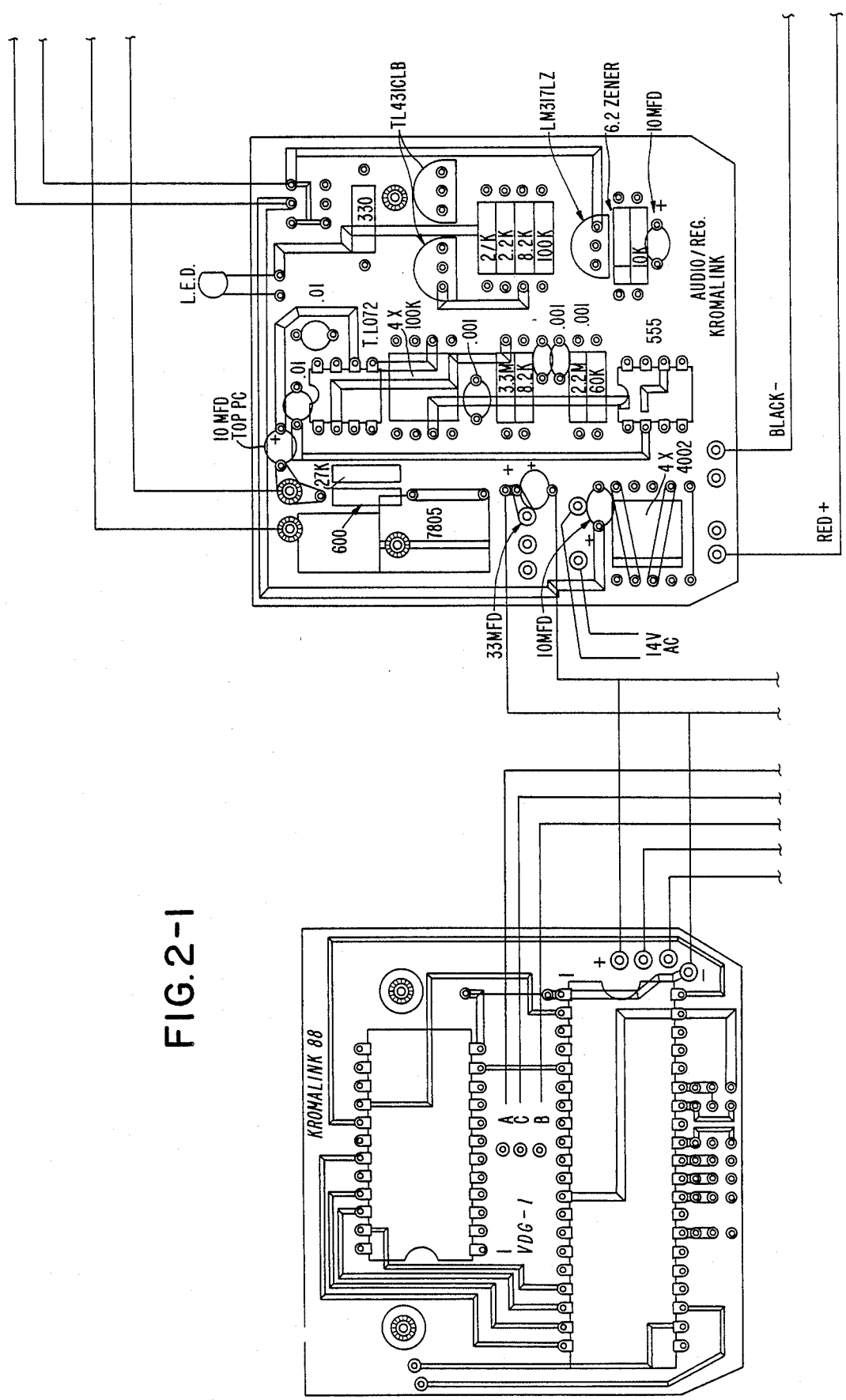
FIG. 1 depicts in simplified, block diagram format, a preferred modulator system or device of this invention.
FIGS. 2 and 3 are detailed parts and wiring diagrams of a single screen modulator system of FIG. 1.
Figure 2:
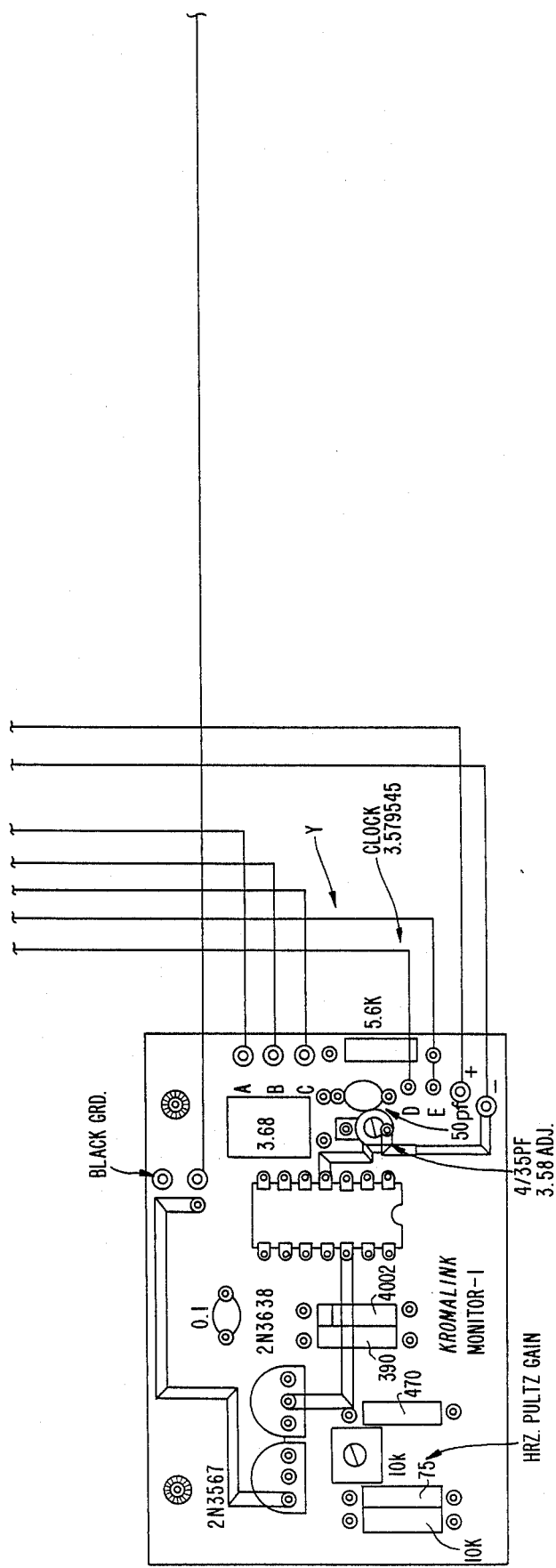
Figures 2, 3:
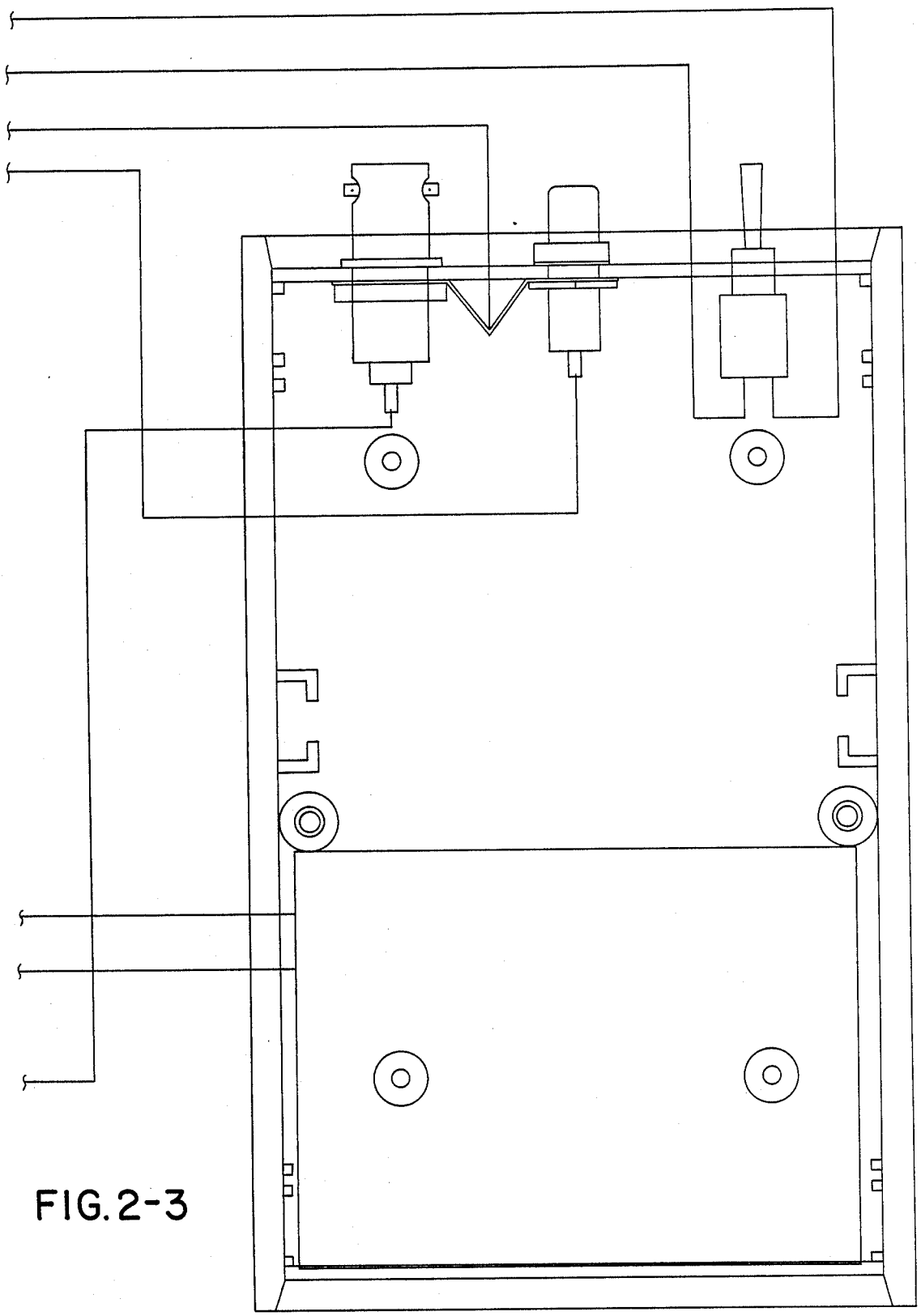

FIG. 1 illustrates one preferred form of this invention in simplified block diagram format and FIGS. 2 and 3 provide the detailed wiring diagrams for the same system. Referring primarily to FIG. 1, the self-contained electrical power supply 10 is preferably in the form of a 12-volt battery pack composed for example of ten 1.2-volt type AA nickel-cadmium cells. Power supply 10 can be recharged as needed by means of jacks 12,12 which are adapted to receive current from an external charger (not shown) and to transmit the current (whether AC or DC) through diode bridge 14 (in which AC is rectified to DC) and thence to the cells of power supply 10.

When an on-off power switch (not shown in FIG. 1, but see FIG. 3) is switched to the "on" position the 12-volt current from power supply 10 is transmitted in parallel to a first standard voltage regulator 20 preferably of a T0220 type (item 7805 in FIGS. 2 and 3), to a second voltage regulator 22 preferably of type T092 (item LM317LZ in FIGS. 2 and 3), and to a low battery indicator 24 preferably composed of two TL431CLB programmable Zener diodes to set up a high and low switch on and off at the level of say, 11 volts DC (note FIGS. 2 and 3) so that L.E.D. 25 provides warning to the user well in advance that a recharge will become necessary for power supply 10.

In the form depicted regulator 20 supplies 7.8 volts to the audio circuit 30 composed of timer 31, and sine wave and current driver integrated circuit 32 (preferably a two part IC TL072). Timer 31 (item 555 in FIGS. 2 and 3) sets up a one thousand cycle (i.e., a 1K Hertz frequency) square wave signal. To make this sound smooth, the square wave signal is changed to a sine wave by means of the first half 32A of integrated circuit 32. The second half of integrated circuit 32 is current driver 32B which drives the sine wave signal to a low impedance of 600 ohms at 1 volt, or 0 dbm rms signal. While it is possible for audio circuit 30 to be designed to function with a higher voltage input and furnish the desired audio tone of 1000 cycles (sine wave) of one volt, peak to peak, at zero levelout, the difference between the 12 volt supply to regulator 20 and the 7.8 volt supply to the audio circuit 30 provides power source 10 more headroom to discharge before the 1KHertz signal starts to change frequency because of low power supply.

The video output system 40 in the preferred form depicted is composed of a video display graphics chip 41, crystal 42, a video display driver chip 43, a decoder chip 45, and an EPROM matrix 47 connected together as depicted in the drawings. In this preferred form as depicted, chip 41 such as a Motorola MC 6847 video display chip, operates on a 5-volt power supply from voltage regulator 22 and a frequency of 3.579545 megahertz from crystal 42. Chip 41 is a full video driver chip and thus has all of the horizontal frequencies of 15,750 and the 60 line vertical built into the chip.

And in the preferred form depicted, chip 43, such as Motorola MC 1372 video display driver, also operates on a frequency of 3.579545 megahertz from crystal 42. Chip 43 provides an output of color bars at one volt, peak to peak, into a 75-ohm load to drive lines or monitors such as TV sets (not shown). By changing chip 43 to an RF type, the device can be used to drive a 75 RF version as well.

In ordinary usage, for an EPROM (erasable programmable read only memory) chip to function it is necessary to address it from a microprocessor and a memory chip along with a memory bank and switching gates. Such a complex system cannot be utilized in a hand-held portable device as provided by this invention. However in the preferred forms depicted it was found possible to provide hand-held modulator devices meeting the requirements of this invention, by suitably coupling video display chip 41 with EPROM matrix 47 in a particular way and utilizing therewith a decoder chip in a particular manner for a particular purpose. More specifically, the EPROM is hooked up as shown to split the four horizontal outputs from chip 41, and by assigning the remaining vertical outputs as well as the 11 address to the EPROM, a matrix results in the EPROM. This matrix is written with an EPROM programer in a fashion such that the horizontal line form, the address line and the vertical inputs constitute data for the graphics. The four horizontal outputs from chip 41 in the form of square waves at various lengths form the width of the color bars and the vertical outputs are scanning out vertical levels which color the display with color bars equaling the U.S. NTSC standard for television. In addition, use of decoder chip 45, preferably a CDMOS 4012AE, in the loop from the EPROM matrix 47 back to chip 41 counts the lines down leaving the last line undecoded whereby the machine code will display the code to the screen. Thus it is possible in the systems of this invention to display names, call signs, and the like in a 32 letter total line of ASCII characters. In particular, by leaving one code line off of chip 45, the address changes to let two lines be characters or words or numbers, such as call signs or etc. Accordingly it is now possible to have a low count number of chips to complete the total display of color bars matching the NTSC standards or other standards that may be programed into the EPROM in forming EPROM matrix 47. Further, by taking separate lines from the EPROM—which in the form depicted and described is a 32K chip—it is possible to decode a total of 8 pages from 512 bytes per page from the EPROM matrix. This is done by use of a binary code derived from an external switch as described hereinafter.

The output signal from the video output system 50 is taken from the overall modulator at output jack 53. Output jack 55 serves as the connection for taking off the audio signal developed by audio circuit 30.

Figures 1, 3:
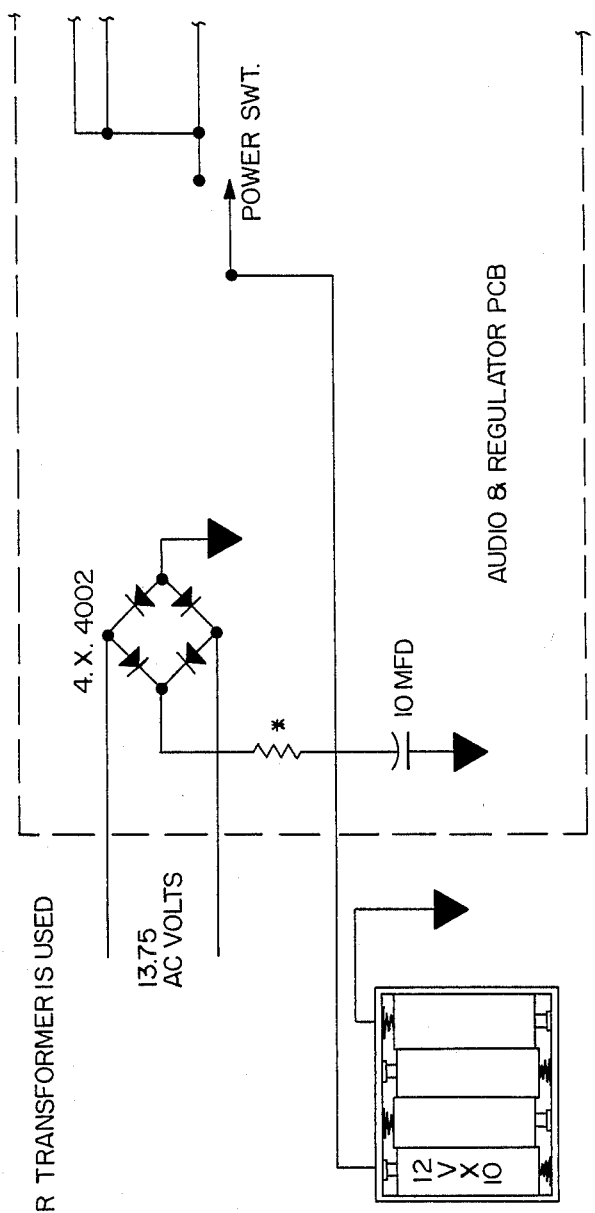
Figures 2, 3:
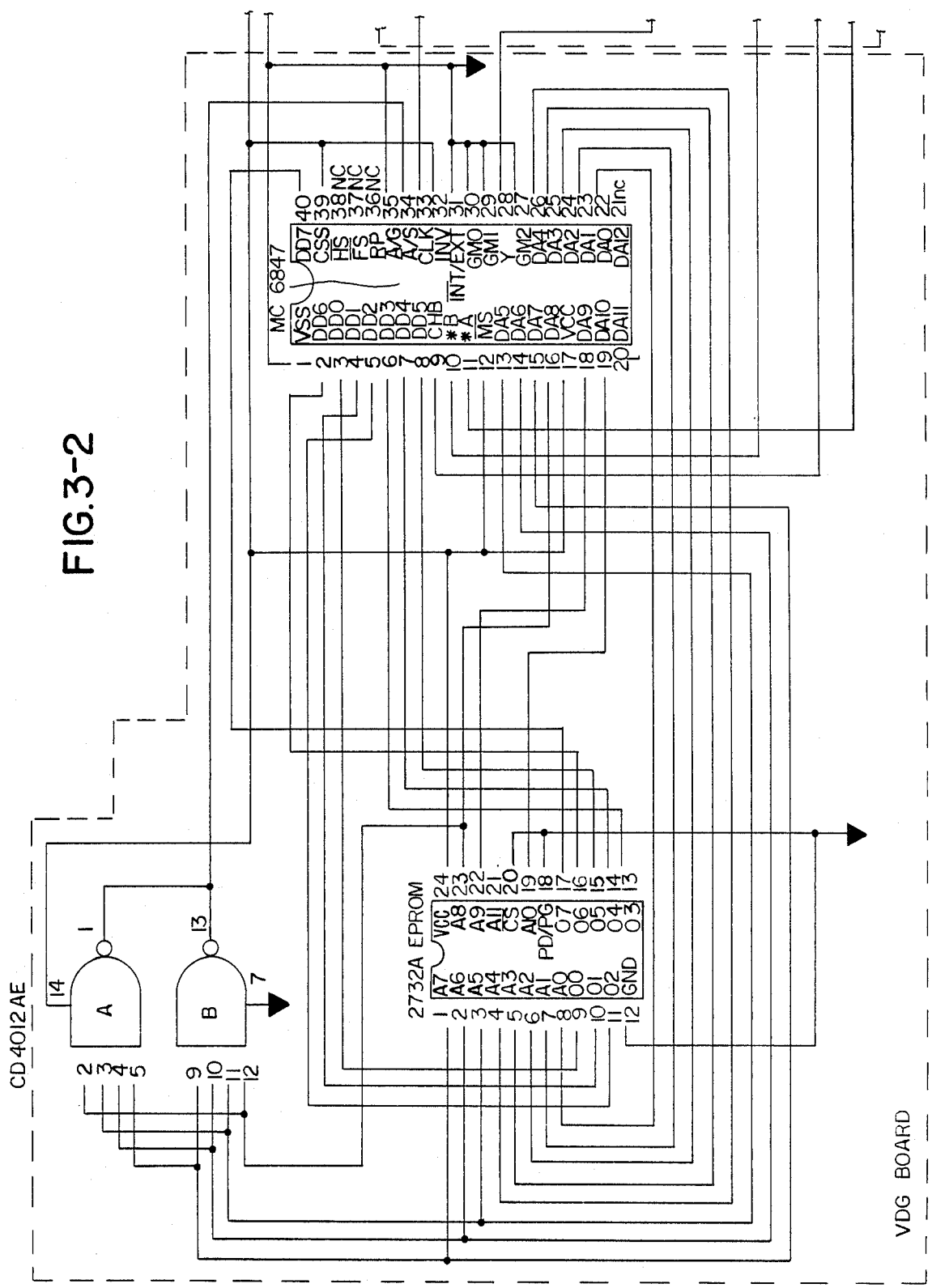
Figure 3:
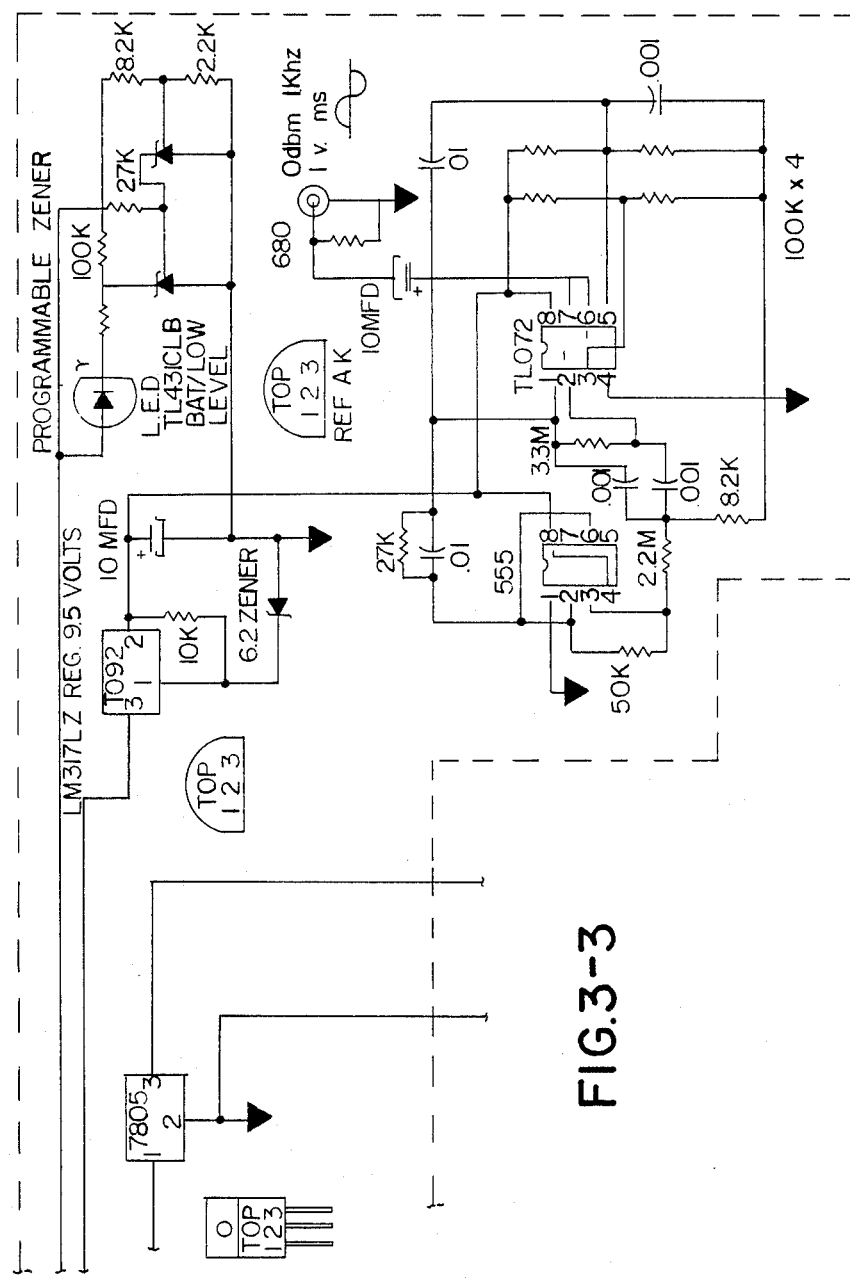
Figures 3, 4:
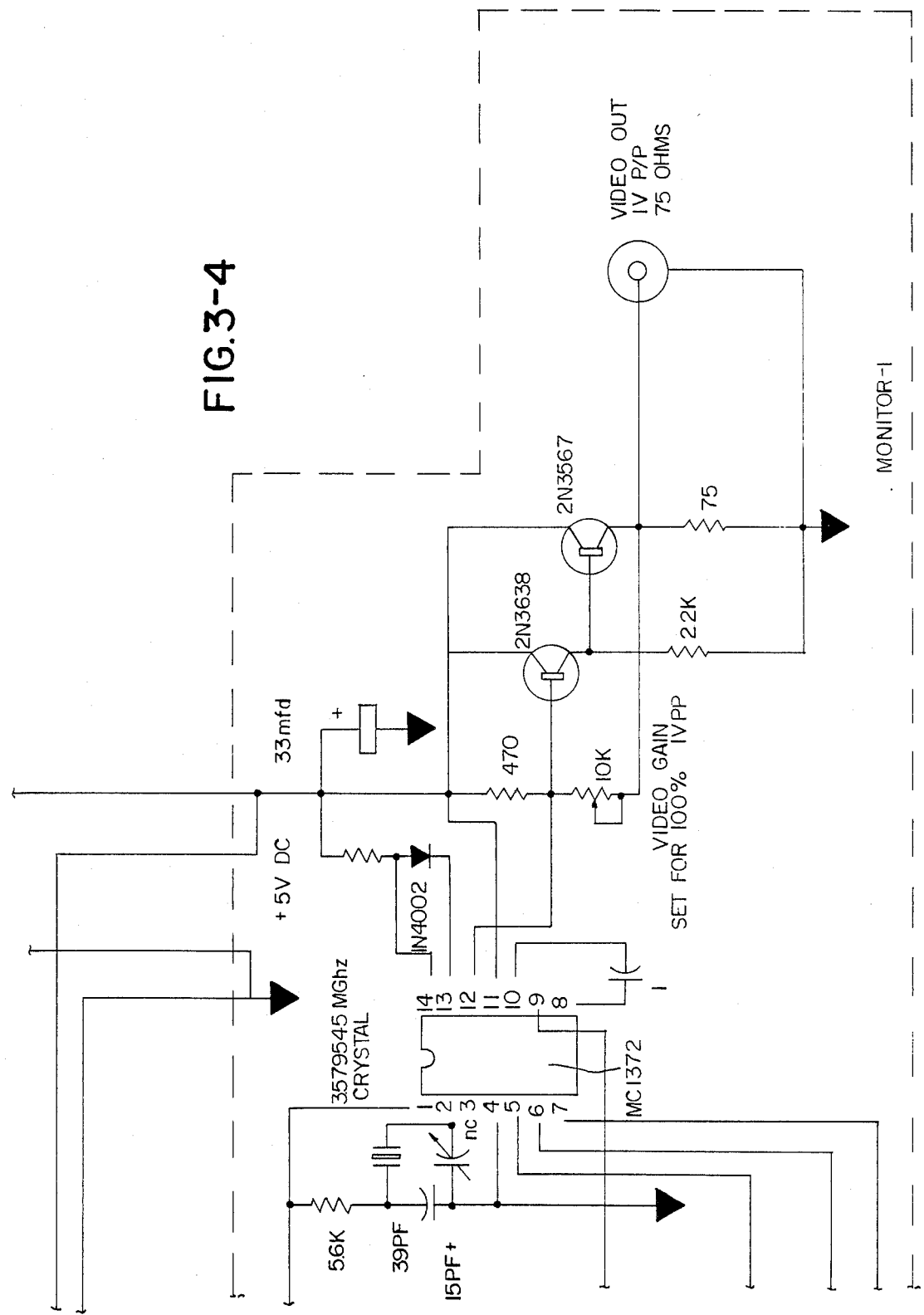
FIG. 4 is a program for an EPROM in a single screen system of the type of FIGS. 2 and 3, the upper 30 lines of which produce the NTSC standard color bars and the bottom two lines of which produce in this particular instance, a trademark display.

A typical program for use in programming the EPROM described above in a system as depicted in FIGS. 2 and 3 is given in FIG. 4. As noted above, the top 30 lines produce the color bars meeting the NTSC standards. The bottom two lines can be, and in this instance are, programed to produce lettering or the like for display on the screen.

The alternative preferred system depicted in detail in FIG. 5 is generally similar to that discussed above in connection with FIGS. 1 through 3, the major difference being the inclusion of a binary code switch ("BCD SWT") connected into the system as shown in FIG. 5, making it possible to provide an eight (8) screen version instead of a single screen version as depicted in FIGS. 2 and 3. A typical program for use in programing the EPROM in a system as depicted in FIG. 5 is given in FIGS. 6A through 6D inclusive, wherein FIG. 6A shows the program for Screen Nos. 1 and 2; FIG. 6B, Screen Nos. 3 and 4; FIG. 6C, Screen Nos. 5 and 6; and FIG. 6D, Screen Nos. 7 and 8. In this eight screen version, the top 30 lines of each screen produce the color bars and the bottom two lines of each screen can be, and in this instance are, programed to produce lettering or the like for display on the screen. As indicated in the tabulation on FIG. 5, in this particular arrangement Screen No. 1 provides color bars meeting the NTSC standards. The color standards produced on the other screens are yellow, magenta and cyan on No. 2, cyan, magenta and green on No. 3, red, magenta and blue on No. 4, green on No. 6, red on No. 7 and blue on No. 8. Horizontal bars are produced in Screen No. 5 of this system. It will be appreciated that it is not necessary to program all eight screens into the system of FIG. 5—any lesser number of such screens can be programed into the system although the resultant system would of course be less versatile.

Dimensions of the casing for the device are not critical, although in the embodiments involving a truly portable, hand-held (pocket size) generator of this invention, the casing will normally be in the range of about 5 to about 8 inches in length, in the range of about 3 to about 4 inches in width, and in the range of about 1 to about 3 inches in thickness. Such casings will thus normally be rectangular in configuration and preferably will be molded from ABS (acrylonitrile-butadiene-styrene copolymer), high impact polystyrene, or other similar plastics.

It will be understood and appreciated that with EPROM devices from different manufacturers the vectors of the colors may not lay in the herein-specified boxes and in some cases the pultz's may not conform with pure TV standards. Thus in any given situation where the characteristics of the chip do not match but are similar to those of the EPROM discussed herein, a suitable program should be developed utilizing the programs shown in FIGS. 4 or 6A to 6D as a general guide.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

What is claimed is:

1. A hand-held modulator which comprises:
   (a) a self-contained electrical power source;
   (b) first means converting power from said source into a 1000 cycle line wave audio tone signal of one volt, peak to peak at zero levelout;
   (c) first output connection means for said signal;
   (d) second means converting power from the power source at least into composite video color bars of one volt, peak to peak, of the U.S. NTSC standard type; and
   (e) second output connection means for such composite video color bars;
   said first means comprising:
      (i) a square wave driver adapted to be energized by the self-contained power source, and
      (ii) a sine wave and current driver integrated circuit to receive the output signal from the square wave driver and adapted to transform such signal into a 1000 cycle sine wave audio tone signal of one volt, peak to peak at zero levelout.

2. A device according to claim 1 wherein said self-contained power source is composed of rechargeable batteries, and the device is equipped with connection means to receive a power supply from a suitable external source for recharging the batteries when and as needed.

3. A device according to claim 2 further including rectifier means so that the incoming current for recharging the batteries, if AC, is converted to DC for the batteries.

4. A device according to claim 2 further including means for producing a signal to show in advance when the power source will be reaching the point of needing a recharge.

5. A device according to claim 2 further including an L.E.D. display and means for producing a signal on said L.E.D. display to show in advance when the power source will be reaching the point of needing a recharge.

6. A device according to claim 2 further including (i) rectifier means so that the incoming current for recharging the batteries, if AC, is converted to DC for the batteries, and (ii) means for producing a signal to show in advance when the power source will be reaching the point of needing a recharge.

7. A device according to claim 2 further including (i) rectifier means so that the incoming current for recharging the batteries, if AC, is converted to DC for the batteries, (ii) an L.E.D. display, and (iii) means for producing a signal on said L.E.D. display to show in advance when the power source will be reaching the point of needing a recharge.

8. A device according to claim 1 further including an on-off power switch and a display therefor.

9. A device according to claim 1 wherein said first output connection means for said signal includes an output jack.

10. A hand-held modulator which comprises:
    (a) a self-contained electrical power source;
    (b) first means converting power from said source into a 1000 cycle line wave audio tone signal of one volt, peak to peak at zero levelout;
    (c) first output connection means for said signal;
    (d) second means converting power from the power source at least into composite video color bars of one volt, peak to peak, of the U.S. NTSC standard type; and
    (e) second output connection means for such composite video color bars;
    said second means including an EPROM matrix coupled to receive the outputs from a video graphics circuit and having decoder means interposed between a loop returning the output from the EPROM matrix to the video graphics circuit and thence to output driver means producing an output of color bars at one volt peak to peak into a 75 ohm load.

11. A device according to claim 10 wherein said EPROM matrix is programed and connected in the device to produce a single screen display of said color bars.

12. A device according to claim 10 wherein said EPROM matrix is programed and connected in the device to produce a plurality of screen displays of color bars, at least one such screen comprising composite video color bars of the U.S. NTSC standard type.

13. A device according to claim 10 wherein said output driver means is of the RF type so as to drive a 75 RF version.

14. A device according to claim 10 wherein said EPROM matrix is also programed to display characters in a 32 letter total line of ASCII characters.

15. A device according to claim 10 further including an on-off power switch and display therefor.

16. A hand-held modulator which comprises:
    (a) a self-contained electrical power source;
    (b) first means converting power from said source into a 1000 cycle line wave audio tone signal of one volt, peak to peak at zero levelout;

(c) first output connection means for said signal;

(d) second means converting power from the power source at least into composite video color bars of one volt, peak to peak, of the U.S. NTSC standard type; and (e) second output connection means for such composite video color bars wherein said first means comprises (i) a square wave driver adapted to be energized by the self-contained power source, and (ii) a sine wave and current driver integrated circuit to receive the output signal from the square wave driver and adapted to transform such signal into a 1000 cycle sine wave audio tone signal of one volt, peak to peak at zero levelout; and wherein said second means includes an EPROM matrix coupled to receive the outputs from a video graphics circuit and having decoder means interposed between a loop returning the output from the EPROM matrix to the video graphics circuit and thence to output driver means producing an output of color bars at one volt peak to peak into a 75 ohm load.

17. A device according to claim 16 wherein said output driver means is of the RF type so as to drive a 75 RF version.

18. A device according to claim 16 wherein said EPROM matrix is also programed to display characters in a 32 letter total line of ASCII characters.

19. A device according to claim 16 wherein said EPROM matrix is programed and connected in the device to produce a single screen display of said color bars.

20. A device according to claim 16 wherein said EPROM matrix is programed and connected in the device to produce a plurality of screen displays of color bars, at least one such screen comprising composite video color bars of the U.S. NTSC standard type.

21. A device according to claim 16 wherein (i) said self-contained power source is composed of rechargeable batteries; (ii) the device is equipped with connection means to receive a power supply from a suitable external source for recharging the batteries when and as needed; (iii) the device includes rectifier means so that the incoming current for recharging the batteries, if AC, is converted to DC for the batteries; (iv) the device includes means for producing a signal to show in advance when the power source will be reaching the point of needing a recharge.

22. A device according to claim 21 wherein said means for producing a signal to show in advance when the power source will be reaching the point of needing a recharge includes an L.E.D. display so that said signal will appear on said L.E.D. display.

23. A device according to claim 16 further including an on-off power switch and display therefor.

24. A modulator for producing a composite video signal comprising composite video color bars of one volt, peak to peak, of the U.S. NTSC standard type, said modulator including an EPROM matrix coupled to receive the outputs from a video graphics circuit and programed to produce said color bars therefrom and having decoder means interposed between a loop returning the output from the EPROM matrix to the video graphics circuit and thence to output driver means producing an output of color bars at one volt peak to peak into a 75 ohm load.

25. A device according to claim 24 wherein said output driver means is of the RF type so as to drive a 75 RF version.

26. A device according to claim 24 wherein said EPROM matrix is also programed to display characters in a 32 letter total line of ASCII characters.

27. A device according to claim 24 further including a self-contained electrical power source.

28. A device according to claim 24 further including means for producing a 1000 cycle sine wave audio tone signal of one volt, peak to peak at zero levelout.

29. A device according to claim 28 further including separate output connection means for said composite video color bars and said audio tone signal.

30. A device according to claim 24 wherein said EPROM matrix is programed and connected in the device to produce a single screen display of said color bars.

31. A device according to claim 24 wherein said EPROM matrix is programed and connected in the device to produce a plurality of screen displays of color bars, at least one such screen comprising said composite video color bars of the U.S. NTSC standard type.

* * * * *